US009961524B2

(12) United States Patent
Suh et al.

(10) Patent No.: US 9,961,524 B2
(45) Date of Patent: May 1, 2018

(54) METHOD AND APPARATUS FOR EFFICIENT SECURITY MANAGEMENT OF DISASTER MESSAGE IN MOBILE COMMUNICATION SYSTEM

(71) Applicant: Samsung Electronics Co., Ltd., Gyeonggi-do (KR)

(72) Inventors: Kyung Joo Suh, Seoul (KR); Sang Soo Jeong, Gyeonggi-do (KR); Sung Hwan Won, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 14/375,122

(22) PCT Filed: Jan. 28, 2013

(86) PCT No.: PCT/KR2013/000658
§ 371 (c)(1),
(2) Date: Jul. 28, 2014

(87) PCT Pub. No.: WO2013/112015
PCT Pub. Date: Aug. 1, 2013

(65) Prior Publication Data
US 2015/0004925 A1 Jan. 1, 2015

Related U.S. Application Data

(60) Provisional application No. 61/591,381, filed on Jan. 27, 2012.

(51) Int. Cl.
*H04M 11/04* (2006.01)
*H04L 9/32* (2006.01)
(Continued)

(52) U.S. Cl.
CPC ............... *H04W 4/22* (2013.01); *H04L 63/12* (2013.01); *H04W 12/10* (2013.01); *H04W 12/04* (2013.01); *H04W 12/06* (2013.01)

(58) Field of Classification Search
CPC ..... H04W 12/04; H04W 12/06; H04W 12/10; H04W 4/22
(Continued)

(56) References Cited

U.S. PATENT DOCUMENTS 5,715,518 A * 2/1998 Barrere ................. H04W 12/06
340/5.8
6,061,799 A * 5/2000 Eldridge ............... H04L 9/3271
726/20
(Continued)

OTHER PUBLICATIONS

Vodaphone, 3GPP TSG SA WG3 (Security) Meeting #63, S3-110394, Distribution of keys for protecting public warning messages, Apr. 11-15, 2011, Chengdu, China.*
(Continued)

*Primary Examiner* — Rafael Pérez-Gutiérrez
*Assistant Examiner* — Mark G. Pannell

(57) ABSTRACT

The present invention relates to a public warning system (PWS) in a mobile Communication network, and the present invention relates to a method and an apparatus for resolving a security problem occurring in the PWS with a protocol and actions between other network entities, and managing same. A user equipment (UE), according to the present invention, saves a public key and a public key index pair of a cell broadcast center (CBC), verifies the CBC which has transmitted a digital signature when the digital signature is received from a subject that transmits a public warning, and resolves a security problem related to a public security system so as to receive a message by the public warning system. As a result, according to the present invention, when the public warning message is received in environments
(Continued)

such as an evolved universal terrestrial radio access network (EUTRAN), a universal terrestrial radio access network (UTRAN), or a GSM/EDGE radio access network (GERAN), the subject that has sent the public warning message is verified by the user equipment, thereby enabling the user equipment to perform an action appropriate to the warning message in an emergency disaster situation.

12 Claims, 7 Drawing Sheets

(51) Int. Cl.
*H04W 4/22* (2009.01)
*H04W 12/10* (2009.01)
*H04L 29/06* (2006.01)
*H04W 12/04* (2009.01)
*H04W 12/06* (2009.01)

(58) Field of Classification Search
USPC .............................. 455/404.1; 713/150–194
See application file for complete search history.

(56) References Cited

U.S. PATENT DOCUMENTS

| | | | | |
|---|---|---|---|---|
| 6,842,628 | B1* | 1/2005 | Arnold | H04L 12/587 455/556.2 |
| 7,051,206 | B1* | 5/2006 | Giest | G06Q 20/3674 380/282 |
| 9,038,158 | B1* | 5/2015 | MacKay | H04L 63/107 709/225 |
| 2004/0249817 | A1* | 12/2004 | Liu | H04L 63/0428 |
| 2005/0091402 | A1* | 4/2005 | Satagopan | G06F 17/3089 709/245 |
| 2006/0041755 | A1* | 2/2006 | Pemmaraju | G06F 21/32 713/182 |
| 2007/0297367 | A1* | 12/2007 | Wang | H04L 63/0414 370/331 |
| 2008/0316021 | A1* | 12/2008 | Manz | G06F 19/3418 340/539.13 |
| 2009/0125982 | A1* | 5/2009 | Hirata | G06F 21/31 726/3 |
| 2010/0146057 | A1* | 6/2010 | Abu-Hakima | H04L 12/1859 709/206 |
| 2011/0103302 | A1* | 5/2011 | Hall | A63F 13/10 370/328 |
| 2011/0151828 | A1 | 6/2011 | Gou et al. | |
| 2011/0237218 | A1 | 9/2011 | Aoyama et al. | |
| 2012/0163600 | A1* | 6/2012 | Kim | H04L 63/065 380/270 |
| 2012/0204032 | A1* | 8/2012 | Wilkins | H04L 9/006 713/170 |
| 2012/0290427 | A1* | 11/2012 | Reed | G06Q 50/01 705/26.2 |
| 2013/0185561 | A1* | 7/2013 | Brusilovsky | H04L 63/0823 713/170 |

OTHER PUBLICATIONS

International Search Report dated May 1, 2013 in connection with International Patent Application No. PCT/KR2013/000658, 5 pages.
Written Opinion of International Searching Authority dated May 1, 2013 in connection with International Patent Application No. PCT/KR2013/000658, 3 pages.
3GPP TS 22.268 V11.2.0, Public Warning (PWS) requirements (Release 11), Oct. 3, 2011, 15 pages.
3GPP TS 22.168 V8.1.0, "Earthquake and Tsunami Warning System (ETWS) requirements; Stage 1 (Release 8)", Jun. 11, 2008, 12 pages.
3GPP TS 23.401 V10.5.0, General Packet Radio Service (GPRS) enhancements for Evolved Universal Terrestrial Radio Access Network (E-UTRAN) access (Release 10), Sep. 27, 2011, 282 pages.

* cited by examiner

METHOD AND APPARATUS FOR EFFICIENT SECURITY MANAGEMENT OF DISASTER MESSAGE IN MOBILE COMMUNICATION SYSTEM

CROSS-REFERENCE TO RELATED APPLICATION(S)

The present application claims priority under 35 U.S.C. § 365 to International Patent Application No. PCT/KR2013/000658 filed Jan. 28, 2013, entitled "METHOD AND APPARATUS FOR EFFICIENT SECURITY MANAGEMENT OF DISASTER MESSAGE IN MOBILE COMMUNICATION SYSTEM". International Patent Application No. PCT/KR2013/000658 claims priority under 35 U.S.C. § 365 and/or 35 U.S.C. § 119(e) to U.S. Provisional Patent Application No. 61/591,381 filed Jan. 27, 2012, and which are incorporated herein by reference into the present disclosure as if fully set forth herein.

TECHNICAL FIELD

The present invention relates to a mobile communication system and, in particular, to a method and apparatus for supporting a procedure of receiving, at a terminal, disaster information securely in a public warning system interoperating with the mobile communication system.

BACKGROUND ART

Mobile communication systems were developed to provide the subscribers with voice communication services on the move. With the rapid advance of technologies, the mobile communication systems have evolved to support high speed data communication services beyond the early voice-oriented services. However, the limited resource and user requirements for higher speed services in the current mobile communication system spur the evolution to more advanced mobile communication systems.

In the conventional system structure, when a warning message is received from a public warning system, the UE takes an action upon receipt of the warning message without verifying the transmitter of the warning message.

DISCLOSURE INVENTION

Technical Problem

The present invention has been conceived to solve the above problem and aims to provide an apparatus and method for facilitating PWS-related operations of the terminal securely and efficiently in communication with the network in the evolved mobile communication system such as 3GPP EPS (E-UTRAN) and UTRAN.

Solution to Problem

In accordance with an aspect of the present invention, a warning message reception method of a terminal in a mobile communication system includes receiving a public key of a cell broadcast center and a key index, receiving a warning message including a digital signature signed by the cell broadcast center, a key index, and a digital signature algorithm from a base station, searching for a public key based on the key index included in the warning message, and authenticating a sender by verifying the digital signature included in the warning message based on the public key.

In accordance with an aspect of the present invention, a terminal receiving a warning message in a mobile communication system includes a transceiver which transmits and receives signals to and from a base station, a storage unit which stores a public key of a cell broadcast center and a key index, and a control unit which controls the storage unit to store the public key and key index received from the cell broadcast center, searches, when a warning message including a digital signature signed by the cell broadcast center, a key index, and a digital signature algorithm is received from a base station, for the public key based on the key index included in the warning message, and authenticates a sender by verifying the digital signature included in the warning message based on the public key.

Advantageous Effects Invention

The present invention is advantageous in terms of guaranteeing the security of the public warning message and taking an appropriate action in response to the public waning message by verifying the transmitter of the PWS message when the terminal receives public warning (disaster warning message) information in an environment such as Evolved Universal Terrestrial Radio Access Network (E-UTRAN) and Universal Terrestrial Radio Access Network (UTRAN)/GSM/EDGE Radio Access Network (GERAN).

MODE FOR THE INVENTION

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

The present invention provides a method for a terminal performing communication in a mobile communication system environment, particularly performing warning system operation (i.e. receiving PWS message) to handle and managing the public warning message securely. Although the description is directed to the 3GPP EPS, UTRAN, and GERAN, the present invention is applicable to other mobile communication systems. The secure PWS message receiving/handling procedure of the terminal according to the present invention can be implemented with various modifications without departing from the scope of the present invention.

Figure 1A:
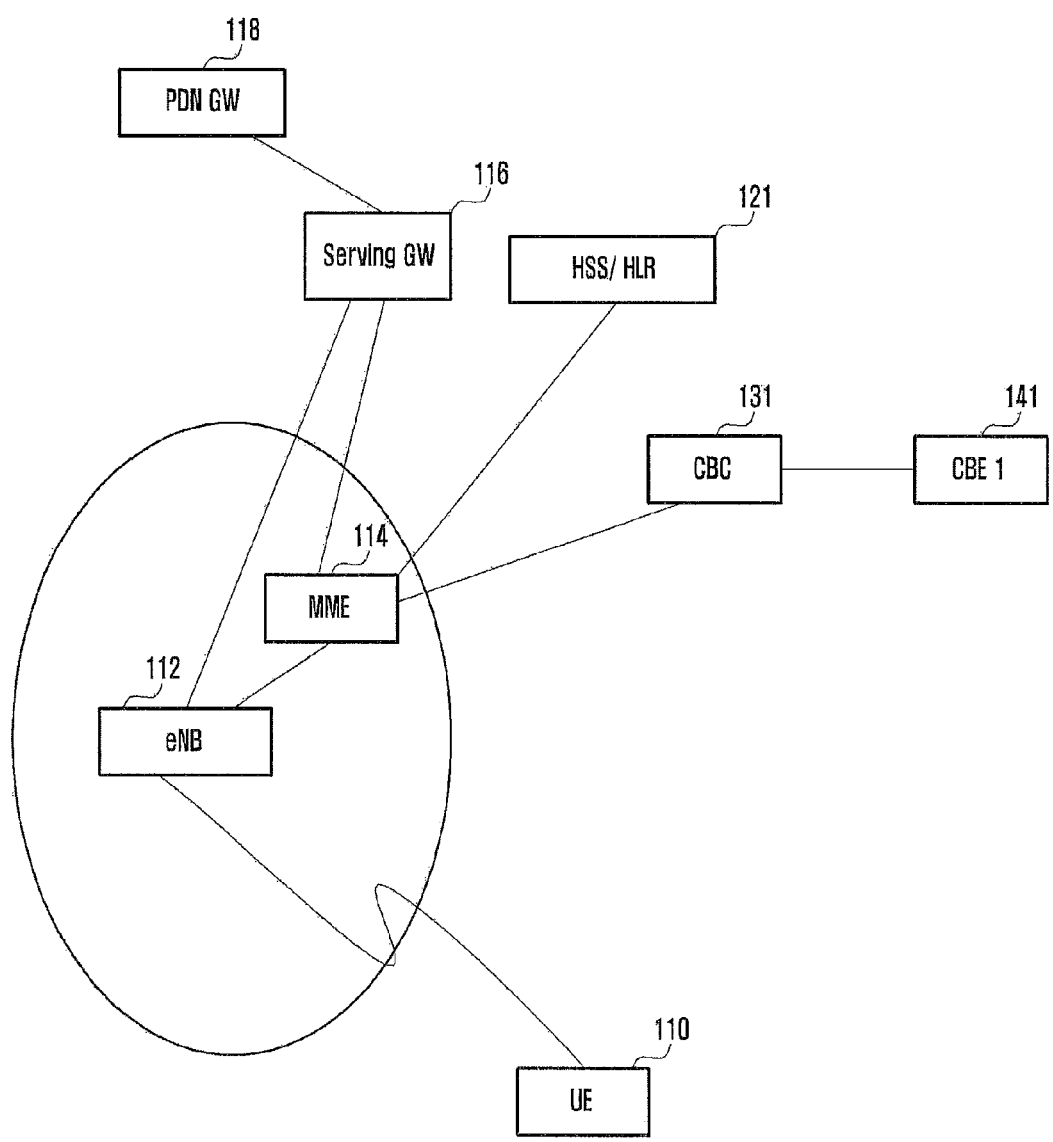
FIG. 1A is a diagram illustrating the architecture of EUTRAN according to an embodiment of the present invention.
Figure 1B:
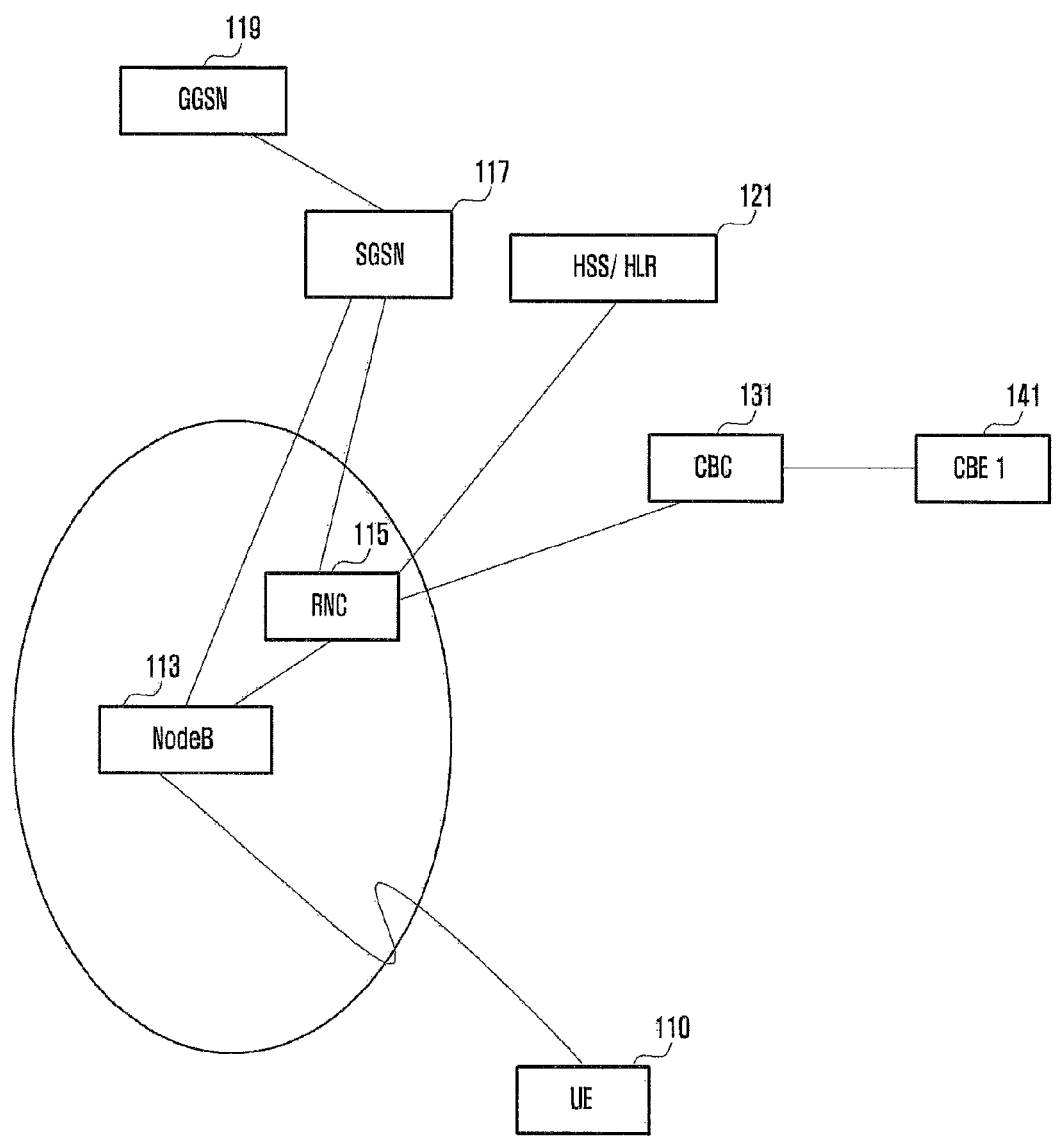
FIG. 1B is a diagram illustrating the architecture of UTRAN according to another embodiment of the present invention.

The embodiments of FIGS. 1A and 1B propose a secure public warning message communication method of a terminal in the EUTRAN or 3GPP environment. It is understood by those skilled in the art that the embodiments of the present invention described herein are not limited to the EUTRAN or 3GPP environment but applicable to other communication systems having the similar technical background, channel format and network architecture, and protocol similar or different but operating similarly, with a slight modification, without departing from the spirit and scope of the present invention.

FIG. 1A is a diagram illustrating the mobile communication system environment to which the public warning system (disaster warning system) is applied according to an embodiment of the present invention. FIG. 1A shows the 3GPP EPS system architecture. Although the description is directed to E-UTRAN, the present can be applied to other mobile communication systems.

Referring to FIG. 1A, a User Equipment (UE) 110 establishes a wireless communication with an evolved Node B (eNB) 112 for communication. The UE 110 connects to a packet data network such as Internet through a Serving Gateway (Serving GW or S-GW) 116.

The authentication information and service information associated with the user and UE are managed by a Home Subscriber Server (HSS)/Home Location Register (HLR)/Authentication Center 121.

A Mobility Management Entity (MME) 114 manages UE mobility and location registration. Meanwhile, there is a Cell Broadcast Center (CBC) 131 and a Cell Broadcast Entity (CBE) 141 for transmitting public warning (disaster warning) message to the UEs, and it may be possible for a plurality of CBEs to connect to one CBC.

Figure 2:
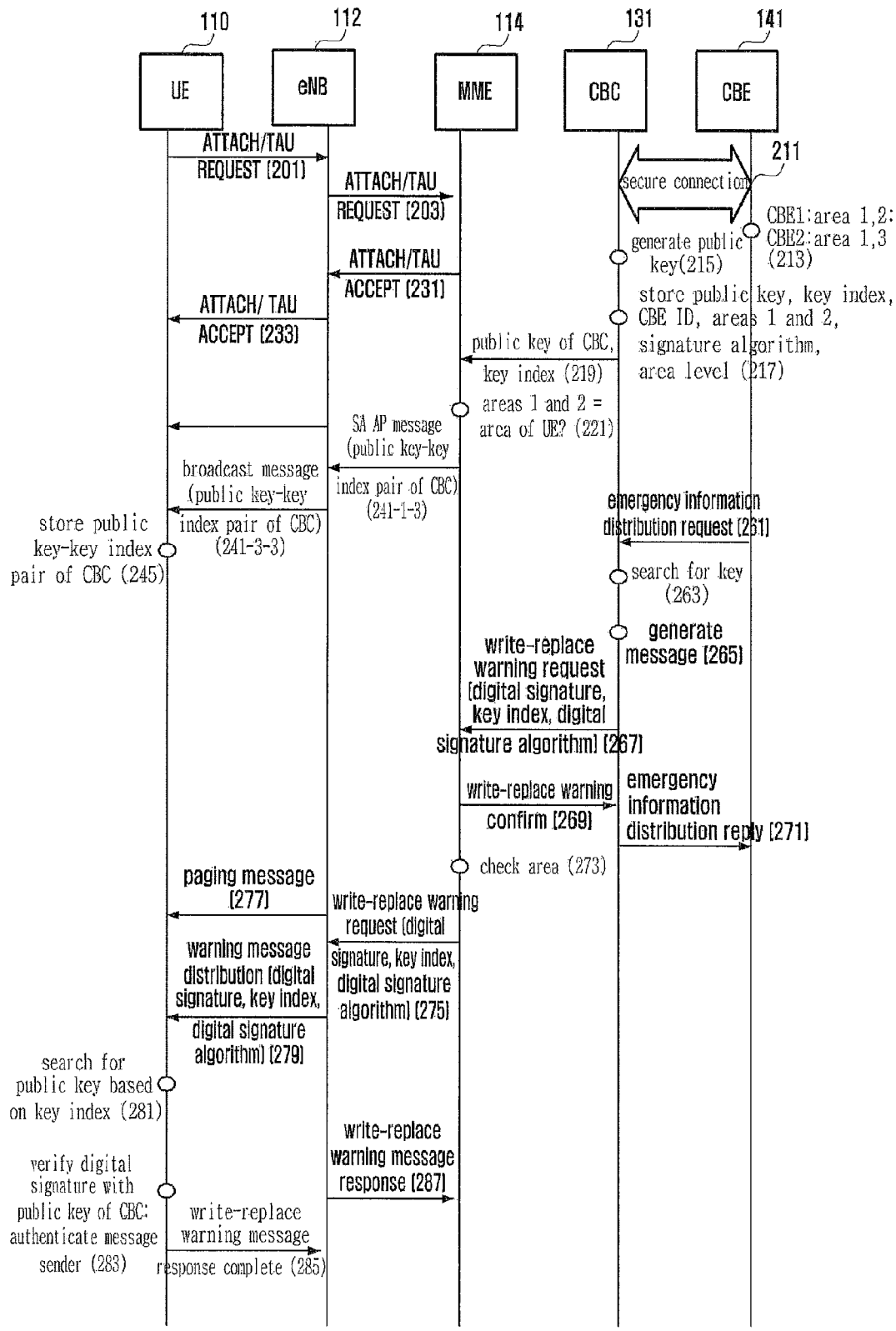
FIG. 2 is a signal flow diagram illustrating a public warning system security procedure according to an embodiment of the present invention.
Figure 3:
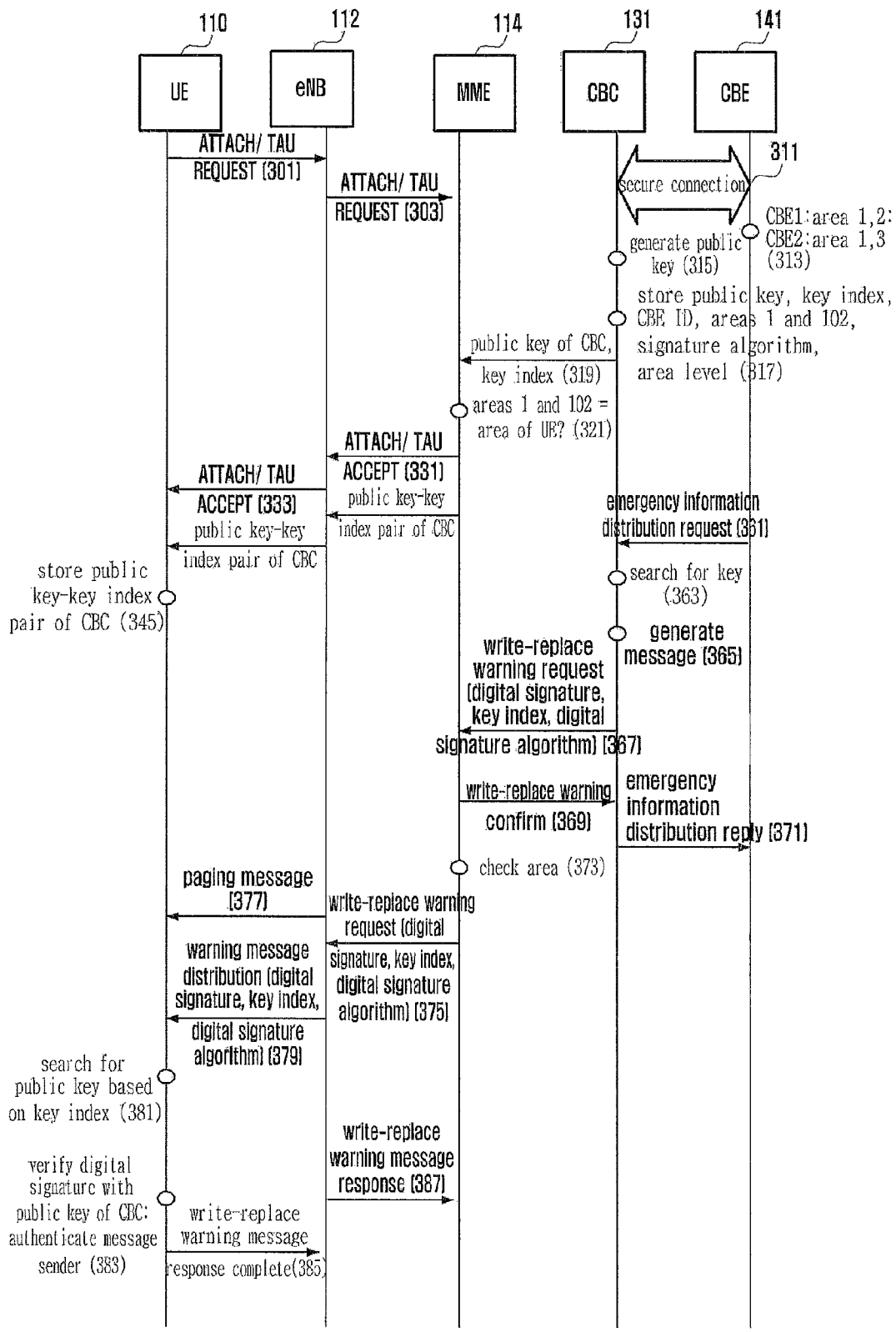
FIG. 3 is a signal flow diagram illustrating a public warning system security procedure according to another embodiment of the present invention.
Figure 4:
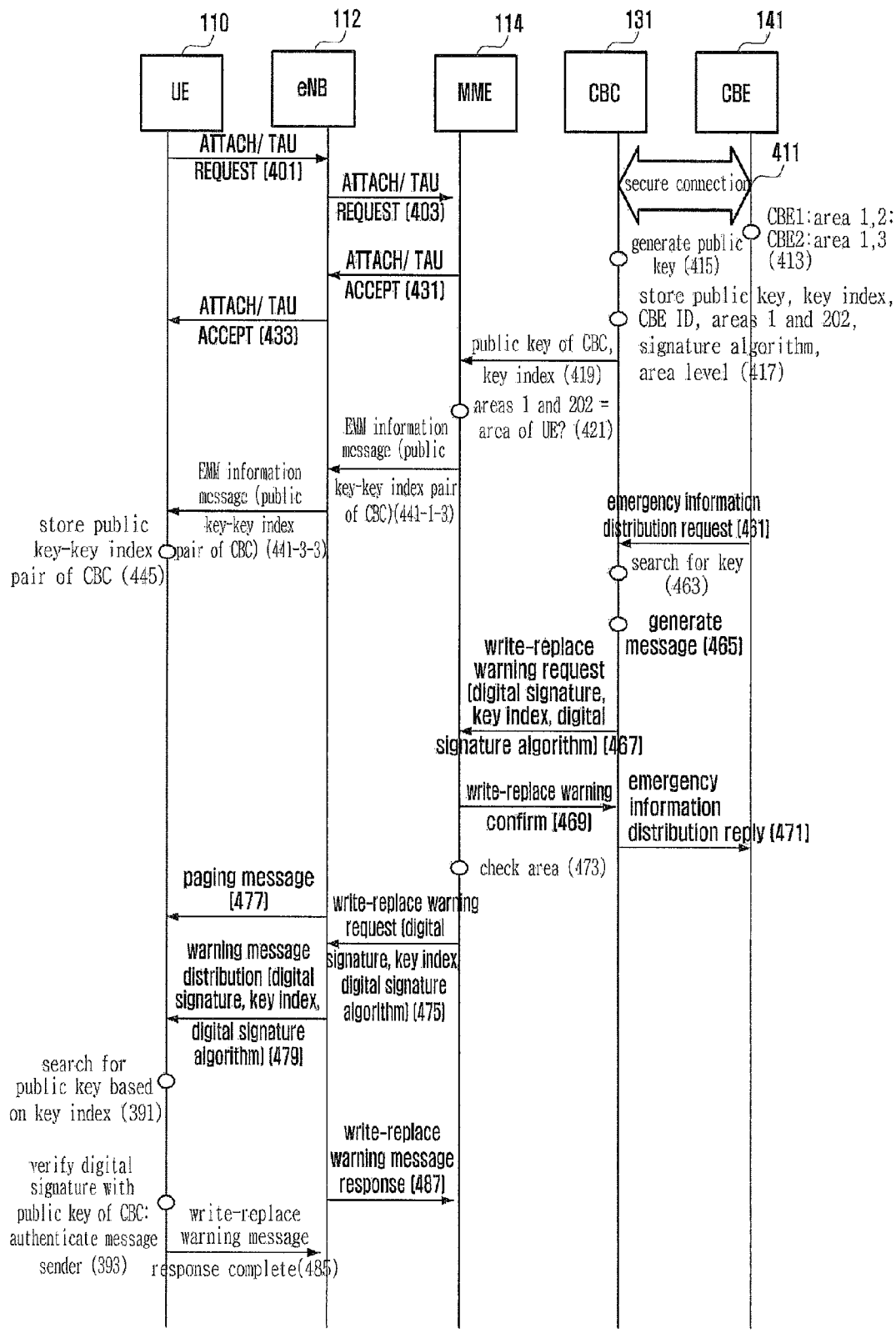
FIG. 4 is a signal flow diagram illustrating a public warning system security procedure according to another embodiment of the present invention.

A description is made of the procedure for the network entities including UE 110, HSS 121, eNB 112, MME 114, CBC 131, and CBE 141 to operate for delivery of the public warning information to the user securely on the protocol used in the mobile communication and Internet communication with reference to FIGS. 2 to 4.

FIG. 1B is a diagram illustrating the mobile communication system environment to which the public warning system (disaster warning system) is applied according to another embodiment of the present invention is applied. FIG. 1B shows the 3GPP UTRAN system architecture.

Although the description is directed to UTRAN, the present invention can be applied to other mobile communication systems. Referring to FIG. 1B, a User Equipment (UE) 110 establishes a wireless communication with a Node B 113 for communication. The UE 110 connects to a packet data network such as Internet through a Serving GPRS Support Node (SGSN) 117 and Gateway GPRS Support Node (GGSN) 119.

The authentication information and service information associated with the user and UE are managed by a Home Subscriber Server (HSS)/Home Location Register (HLR)/Authentication Center 121. Meanwhile, there is a Cell Broadcast Center (CBC) 131 and a Cell Broadcast Entity (CBE) 141 for transmitting public warning (disaster warning) message to the UEs, and it may be possible for a plurality of CBEs to connect to one CBC.

Figure 5:
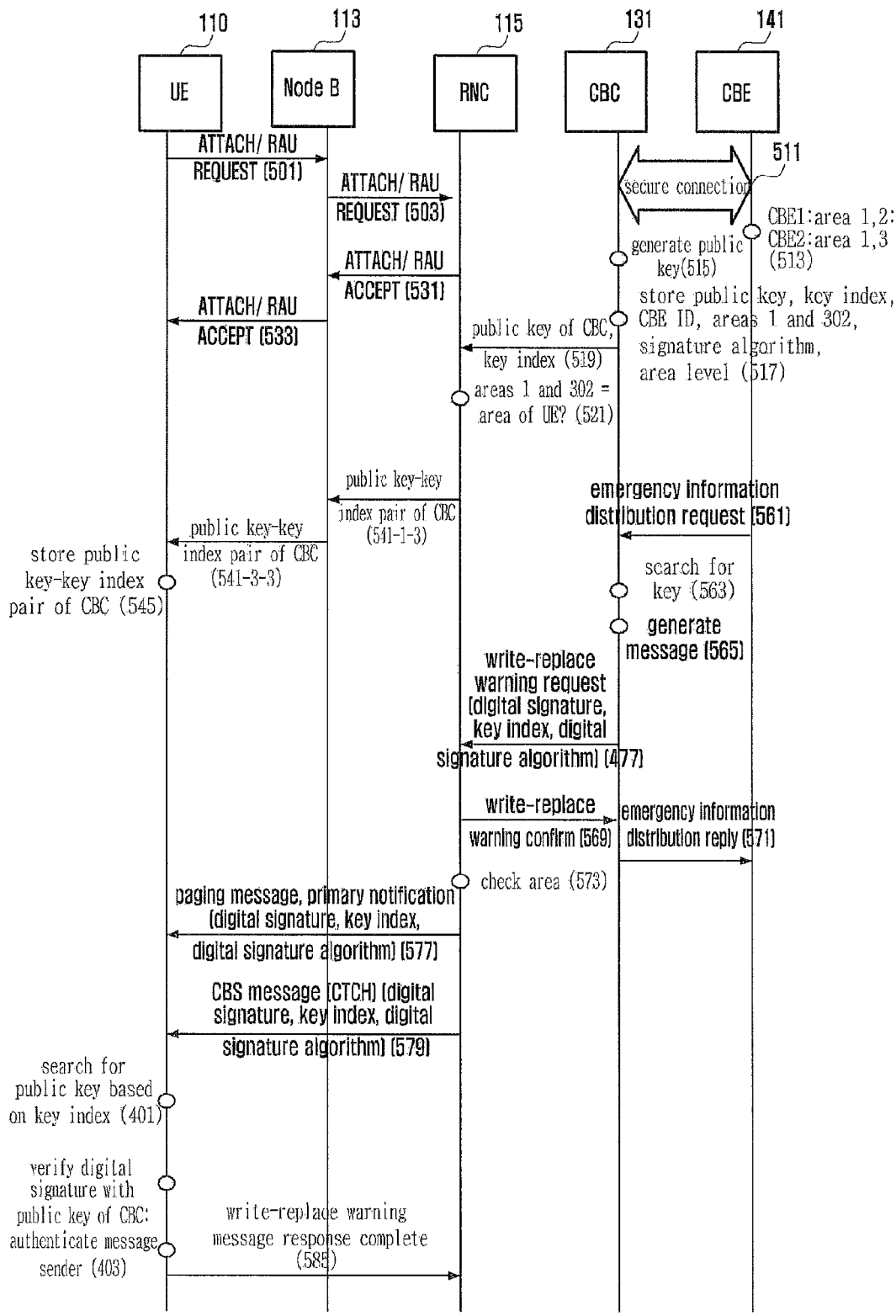
FIG. 5 is a signal flow diagram illustrating a public warning system security procedure according to another embodiment of the present invention.

A description is made of the procedure for the network entities including UE 110, HSS 121, Node B 113, RNC 115, CBC 131, and CBE 141 to operate for delivery of the public warning information to the user securely on the protocol used in the mobile communication and Internet communication with reference to FIG. 5.

FIG. 2 is a signal flow diagram illustrating a public warning system security procedure according to an embodiment of the present invention.

The UE sends the eNB a message such as ATTACH REQUEST/TAU REQUEST message at step 201. The eNB forwards the ATTACH REQUEST/TAU REQUEST message to the MME at step 203. The MME sends the eNB an ATTACH ACCEPT/TAU ACCEPT message at step 231. Next, the eNB forwards the ATTACH ACCEPT/TAU ACCEPT message to the UE at step 233.

Meanwhile, the CBC and CBE establish the security-reinforced connection therebetween at step 211. The connection security is configured between these two entities through IP sec or other methods.

The CBE configures an area in which the warning message is broadcast at step 213. There may be several CBEs, e.g. CBE1 configured with areas 1 and 2 and CBE2 configured with areas 1 and 3 at the cell level, TA level, or PLMN level. In this embodiment, the area 1 is an overlapped area, and the areas 2 and 3 are the separated areas.

Next, the CBC generates a public key for the UEs within the warning message broadcast area to use for authenticating the CBC at step 215. The CBC stores the public key, key index, Identifier (ID) of CBE transmitting the warning message to the CBC, disaster warning message broadcast area, electronic signature algorithm, and area level at step 217. Here, the area level may correspond to cell level, TA level, or PLMN level. In an embodiment, the public key may be configured differently depending on the area, public key value, and related CBE. The key 1 is of the CBE1 for service in the areas 1 and 2 at cell level, the key 2 is of being used for service in areas 1 and 3 at cell level, key 3 is of being used for service in areas A, B, and C at TA level, and key 4 may be generated as a key is of being used in the areas 1 and 2 in order for the CBE2 to broadcast the warning message in the areas 1 and 2. Meanwhile, the key 5 may be the key allocated newly in updating the public key within the areas 1 and 2 at cell level which the CBE1 has served. The key 5 may be the key updated newly from the key used when the CBE1 generates the message to the UE1 as time progresses or the key updated to be transmitted to the UE1 within in the areas 1 and 2 as well as UE2.

The CBC sends the MME the public key and key index at step 219. This process may occur when the UE location is changed. For example, when the UE1 moves from areas 1 and 2 to areas 1 and 3, this process may occur and, at this time, the public key of the CBC may be generated newly as at step 215 or updated for transmission to the MME as at step 219. Even in the case that the public key KEY1 used by the UE1 in the areas 1 and 2 is updated to be transmitted to the UE2 entered the areas 1 and 2, this process is performed to notify the UE1 of the change. In order to notify of the key update or transmit the public key generated by the CBC to the UE, the process 241-1-3 and 241-3-3 may be performed.

At steps 241-1-3 and 241-3-3, the MME sends the eNB a pair of public key and key index using an S1-Application Protocol (S1-AP) message. Examples of the S1-AP message may include write-replace warning, reset, S1 setup response, MME configuration update, overload start, overload stop, kill, MME direction information transfer, MME configuration transfer, etc.

The eNB transmits the pair of public key and key index of the CBC using the SIB broadcast message at step 241-3-3.

At step 245, the UE stores the paired public key and key index of the CBC. The public key and key index pair of the CBC can be configured as follows. In embodiment 1, if the UE1 generates the KEY1 on Jan. 1, 2012, if the UE2 differs from the UE1 in time (e.g. Jan. 5, 2012), area (e.g. areas 1 and 2), or CBE, the public key may be updated and transmitted.

In another embodiment, since the key1 is generated to the UE1 for use in the areas 1 and 2 and the key2 for use in the areas 1 and 3, the key1-key index1 and key2-key index2 pairs may be transmitted to the UE1.

In another embodiment, if the CBE1 and CBE2 transmit messages to the UE1 using the respective key1 and key4, different key indices and public keys may be transmitted.

Afterward, the CBE sends the CBC an emergency information distribution request at step 261. Then the CBC generates a warning message at step 265. This message may be transmitted within an area specified at cell level, TA level, or PLMN level.

In order to generate this message, the CBC searches for the key at step 263. At step 265, the CBC generates the message using the public key corresponding to the area and CBE for use in transmitting the warning message from the CBC to the MME. In an embodiment, if the CBE1 has transmitted the emergency information distribution request and if the area is determined as areas 1 and 2 at cell level, the CBC searches for the public key fulfilling the conditions. If plural keys are found, e.g. key1 and key5 are found and if key5 is the key updated lately in the corresponding area, the UE which has received key1 updates the key to key5 for generating messages therewith.

In the case that there are key1 and key5 for the same CBE and same areas 1 and 2, it may be possible to transmit the digital signatures generated using the public keys key1 and key5 and, if at least one of the digital signatures 1 and 5 is verified by the UE, determine that the authentication is successful.

The CBC sends the MME a write-replace warning request message including the digital signature, key index, and digital signature algorithm at step 267.

If the digital signature algorithm has been agreed between the CBC and the UE, an identifier (id) of the digital signature algorithm is used for identification. In this case, the digital signature algorithm identifier may be transmitted. The MME sends the CBC a write-replace warning confirm message at step 269. The CBC sends the CBE an emergency information distribution reply message at step 271.

Afterward, the MME confirms the area, i.e. the area for the MME to transmit message as configured by the CBC for message transmission, at step 273.

At step 275, the MME sends the eNB the write-replace warning request message including the digital signature, key index, and digital signature algorithm or identifier of the digital signature algorism.

The eNB sends the UE a paging message at step 277 and, if it is determined that the UE is listening to the message broadcast by the eNB, broadcasts a warning message distribution message including the digital signature, key index, and digital signature algorithm or digital signature algorithm index at step 279. The UE searches for the public key using the key index at step 281. At this step, the UE may verify the area information corresponding to the key as well as search for the public key using the key index.

The UE authenticates the sender of the warning message by verifying the digital signature using the public key of the CBC at step 283. Afterward, the UE may send the eNB a write-replace warning message response complete message at step 285, and the eNB sends the MME a write-replace warning message response message at step 287.

FIG. 3 is a signal flow diagram illustrating a public warning system security procedure according to another embodiment of the present invention.

The UE transmits an ATTACH REQUEST/TAU REQUEST message at step 301. The eNB forwards the ATTACH REQUEST/TAU REQUEST message to the MME at step 303. The MME sends the eNB the ATTACH ACCEPT/TAU ACCEPT message at step 331. The eNB forwards the ATTACH ACCEPT/TAU ACCEPT message to the eNB at step 333.

Meanwhile, the CBC and CBE establish a secure reinforced connection at step 311. The connection between these two entities are secured using the IP sec or other protocols.

The CBE configures the area for warning message broadcast at step 313. There may be multiple CBEs like CBE1 in charge of areas 1 and 2 and CBE2 in charge of areas 1 and 3 at cell level, TA level, or PLMN level. In the example, the area 1 may be an overlapped area, and areas 2 and 3 may be the areas separated from each other.

At step 315, the CBC generates a public key in order for the UEs to identify the CBC within the warning message broadcast area. The CBC stores the public key, key index, Identifier (ID) of CBE transmitting the warning message to the CBC, disaster warning message broadcast area, electronic signature algorithm, and area level at step 317. Here, the area level may correspond to cell level, TA level, or PLMN level. In an embodiment, the public key may be configured differently depending on the area, public key value, and related CBE.

The key 1 is of the CBE1 for service in the areas 1 and 2 at cell level, the key 2 is of being used for service in areas 1 and 3 at cell level, key 3 is of being used for service in areas A, B, and C at TA level, and key 4 may be generated as a key is of being used in the areas 1 and 2 in order for the CBE2 to broadcast the warning message in the areas 1 and 2. Meanwhile, the key 5 may be the key allocated newly in updating the public key within the areas 1 and 2 at cell level which the CBE1 has served. The key 5 may be the key updated newly from the key used when the CBE1 generates the message to the UE1 as time progresses or the key updated to be transmitted to the UE 1 within in the areas 1 and 2 as well as UE2.

The CBC sends the MME the public key and key index at step 319. This process may occur when the UE location is changed, i.e. when the area to which the UE belongs is changed. For example, when the UE1 moves from areas 1 and 2 to areas 1 and 3, this process may occur and, at this time, the public key of the CBC may be generated newly as at step 315 or updated for transmission to the MME as at step 319.

Even when the public key KEY1 used by the UE1 in the areas 1 and 2 is updated to be transmitted to the UE2 entered the areas 1 and 2, this process is performed to notify the UE1 of the change. In order to notify of the key update or transmit the public key generated by the CBC to the UE, the process 331 and 333 may be performed.

The MME sends the eNB the ATTACH/TAU ACCEPT message including a pair of public key of the CBC and key index at step 331. Next, the eNB forwards the ATTACH/TAU ACCEPT message including the CBC public key-key index pair to the UE at step 333.

The UE stores the public key-key index pair of the CBC at step 345. The public key-key index pair of the CBS can be configured as in the follow embodiment. In embodiment 1, if the UE1 generates the KEY1 on Jan. 1, 2012, if the UE2 differs from the UE1 in time (e.g. Jan. 5, 2012), area (e.g. areas 1 and 2), or CBE, the public key may be updated and transmitted.

In another embodiment, since the key1 is generated to the UE1 for use in the areas 1 and 2 and the key2 for use in the areas 1 and 3, the key1-key index1 and key2-key index2 pairs may be transmitted to the UE1. In another embodiment, if the CBE1 and CBE2 transmit messages to the UE1 using the respective key1 and key4, different key indices and public keys may be transmitted.

The CBE sends the CBC an emergency information distribution request message at step 361. The CBC generates a warning message at step 365. This message may be transmitted within an area specified at cell level, TA level, or PLMN level. In order generate this message, the CBC searches for the key at step 363. The CBC generates the message using the public key corresponding to the area and CBE for use in transmitting the warning message from the CBC to the MME. In an embodiment, if the CBE1 has transmitted the emergency information distribution request and if the area is determined as areas 1 and 2 at cell level, the CBC searches for the public key fulfilling the conditions.

If plural keys are found, e.g. key1 and key5 are found and if key5 is the key updated lately in the corresponding area, the UE which has received key1 updates the key to key5 for generating messages therewith.

In the case that there are key1 and key5 for the same CBE and same areas 1 and 2, it may be possible to transmit the digital signatures generated using the public keys key1 and key5 and, if at least one of the digital signatures 1 and 5 is verified by the UE, determine that the authentication is successful.

The CBC sends the MME a write-replace warning request message including the digital signature, key index, and digital signature algorithm at step 367. If the digital signature algorithm has been agreed between the CBC and the UE, an identifier (id) of the digital signature algorithm is used for identification. In this case, the digital signature algorithm identifier may be transmitted. The MME sends the CBC a write-replace warning confirm message at step 369. The CBC sends the CBE an emergency information distribution reply message at step 371.

Afterward, the MME confirms the area, i.e. the area for the MME to transmit message as configured by the CBC for message transmission, at step 373. At step 375, the MME sends the eNB the write-replace warning request message including the digital signature, key index, and digital signature algorithm or identifier of the digital signature algorism. The eNB sends the UE a paging message at step 377 and, if it is determined that the UE is listening to the message broadcast by the eNB, broadcasts a warning message distribution message including the digital signature, key index, and digital signature algorithm or digital signature algorithm index at step 379. The UE searches for the public key using the key index at step 381. At this step, the UE may verify the area information corresponding to the key as well as search for the public key using the key index.

The UE authenticates the sender of the warning message by verifying the digital signature using the public key of the CBC at step 383. Afterward, the UE may send the eNB a write-replace warning message response complete message at step 385, and the eNB sends the MME a write-replace warning message response message at step 387.

FIG. 4 is a signal flow diagram illustrating a public warning system security procedure according to another embodiment of the present invention.

The UE sends the eNB a message such as ATTACH REQUEST/TAU REQUEST message at step 401. The eNB forwards the ATTACH REQUEST/TAU REQUEST message to the MME at step 403. The MME sends the eNB an ATTACH ACCEPT/TAU ACCEPT message at step 431. Next, the eNB forwards the ATTACH ACCEPT/TAU ACCEPT message to the UE at step 433.

Meanwhile, the CBC and CBE establish the security-reinforced connection therebetween at step 411. That is, the connection security is configured between these two entities through IP sec or other methods. The connection security is configured between these two entities through IP sec or other methods. The CBE configures an area in which the warning message is broadcast at step 413. There may be several CBEs, e.g. CBE1 configured with areas 1 and 2 and CBE2 configured with areas 1 and 3 at the cell level, TA level, or PLMN level. In this embodiment, the area 1 may be an overlapped area, and areas 2 and 3 may be the areas separated from each other.

At step 415, the CBC generates a public key in order for the UEs to identify the CBC within the warning message broadcast area. The CBC stores the public key, key index, Identifier (ID) of CBE transmitting the warning message to the CBC, disaster warning message broadcast area, electronic signature algorithm, and area level at step 417. Here, the area level may correspond to cell level, TA level, or PLMN level. In an embodiment, the public key may be configured differently depending on the area, public key value, and related CBE.

The key 1 is of the CBE1 for service in the areas 1 and 2 at cell level, the key 2 is of being used for service in areas 1 and 3 at cell level, key 3 is of being used for service in areas A, B, and C at TA level, and key 4 may be generated as a key is of being used in the areas 1 and 2 in order for the CBE2 to broadcast the warning message in the areas 1 and 2. Meanwhile, the key 5 may be the key allocated newly in updating the public key within the areas 1 and 2 at cell level which the CBE1 has served. The key 5 may be the key updated newly from the key used when the CBE1 generates the message to the UE1 as time progresses or the key updated to be transmitted to the UE 1 within in the areas 1 and 2 as well as UE2.

The CBC sends the MME the public key and key index at step 419. This process may occur when the UE location is changed, i.e. when the area to which the UE belongs is changed. For example, when the UE1 moves from areas 1 and 2 to areas 1 and 3, this process may occur and, at this time, the public key of the CBC may be generated newly as at step 415 or updated for transmission to the MME as at step 419. Even when the public key KEY1 used by the UE1 in the areas 1 and 2 is updated to be transmitted to the UE2 entered the areas 1 and 2, this process is performed to notify the UE1 of the change. In order to notify of the key update or transmit the public key generated by the CBC to the UE, the process 441-1-3 and 441-3-3 may be performed.

At steps 441-1-3 and 441-3-3, the MME sends the eNB an EMM INFORMATION message including the public key-key index pair of the CBC. Afterward, the eNB forwards the EMM INFORMATION message including the public key-key index pair to the UE at step 441-3-3. The UE stores the public key-key index pair of the CBC at step 445. The public key-key index pair of the CBC may be configured as follows.

The UE stores the public key-key index pair of the CBC at step 445. The public key-key index pair of the CBS can be configured as in the follow embodiment. In embodiment 1, if the UE1 generates the KEY1 on Jan. 1, 2012, if the UE2 differs from the UE1 in time (e.g. Jan. 5, 2012), area (e.g. areas 1 and 2), or CBE, the public key may be updated and transmitted. In another embodiment, since the key1 is generated to the UE1 for use in the areas 1 and 2 and the key2 for use in the areas 1 and 3, the key1-key index 1 and key2-key index2 pairs may be transmitted to the UE1.

In another embodiment, if the CBE1 and CBE2 transmit messages to the UE1 using the respective key1 and key4, different key indices and public keys may be transmitted.

The CBE sends the CBC an emergency information distribution request message at step 461. The CBC generates a warning message at step 465. This message may be transmitted within an area specified at cell level, TA level, or PLMN level. In order generate this message, the CBC searches for the key at step 463. The CBC generates the message using the public key corresponding to the area and CBE for use in transmitting the warning message from the CBC to the MME at step 465.

In an embodiment, if the CBE1 has transmitted the emergency information distribution request and if the area is determined as areas 1 and 2 at cell level, the CBC searches for the public key fulfilling the conditions. If plural keys are found, e.g. key1 and key5 are found and if key5 is the key updated lately in the corresponding area, the UE which has received key1 updates the key to key5 for generating messages therewith. In the case that there are key1 and key5 for the same CBE and same areas 1 and 2, it may be possible to transmit the digital signatures generated using the public keys key1 and key5 and, if at least one of the digital signatures 1 and 5 is verified by the UE, determine that the authentication is successful.

The CBC sends the MME a write-replace warning request message including the digital signature, key index, and digital signature algorithm at step 467. If the digital signature algorithm has been agreed between the CBC and the UE, an identifier (id) of the digital signature algorithm is used for identification. In this case, the digital signature algorithm identifier may be transmitted. The MME sends the CBC a write-replace warning confirm message at step 469. The CBC sends the CBE an emergency information distribution reply message at step 471.

Afterward, the MME confirms the area, i.e. the area for the MME to transmit message as configured by the CBC for message transmission, at step 473. At step 475, the MME sends the eNB the write-replace warning request message including the digital signature, key index, and digital signature algorithm or identifier of the digital signature algorism. The eNB sends the UE a paging message at step 477 and, if it is determined that the UE is listening to the message broadcast by the eNB, broadcasts a warning message distribution message including the digital signature, key index, and digital signature algorithm or digital signature algorithm index at step 479. The UE searches for the public key using the key index at step 481. At this step, the UE may verify the area information corresponding to the key as well as searches for the public key using the key index.

The UE authenticates the sender of the warning message by verifying the digital signature using the public key of the CBC at step 483. Afterward, the UE may send the eNB a write-replace warning message response complete message at step 485, and the eNB sends the MME a write-replace warning message response message at step 487.

FIG. 5 is a signal flow diagram illustrating a public warning system security procedure according to another embodiment of the present invention.

The UE sends the eNB a message such as ATTACH REQUEST/TAU REQUEST message at step 501. The eNB forwards the ATTACH REQUEST/TAU REQUEST message to the RNC at step 503. The RNC sends the eNB an ATTACH ACCEPT/TAU ACCEPT message at step 531. Next, the eNB forwards the ATTACH ACCEPT/TAU ACCEPT message to the UE at step 533.

Meanwhile, the CBC and CBE establish the security-reinforced connection therebetween at step 511. That is, the connection security is configured between these two entities through IP sec or other methods. The connection security is configured between these two entities through IP sec or other methods. The CBE configures an area in which the warning message is broadcast at step 513. There may be several CBEs, e.g. CBE1 configured with areas 1 and 2 and CBE2 configured with areas 1 and 3 at the cell level, TA level, or PLMN level. In this embodiment, the area 1 may be an overlapped area, and areas 2 and 3 may be the areas separated from each other.

At step 515, the CBC generates a public key in order for the UEs to identify the CBC within the warning message broadcast area. The CBC stores the public key, key index, Identifier (ID) of CBE transmitting the warning message to the CBC, disaster warning message broadcast area, electronic signature algorithm, and area level at step 517. Here, the area level may correspond to cell level, TA level, or PLMN level. In an embodiment, the public key may be configured differently depending on the area, public key value, and related CBE. The key 1 is of the CBE1 for service in the areas 1 and 2 at cell level, the key 2 is of being used for service in areas 1 and 3 at cell level, key 3 is of being used for service in areas A, B, and C at TA level, and key 4 may be generated as a key is of being used in the areas 1 and 2 in order for the CBE2 to broadcast the warning message in the areas 1 and 2. Meanwhile, the key 5 may be the key allocated newly in updating the public key within the areas 1 and 2 at cell level which the CBE1 has served. The key 5 may be the key updated newly from the key used when the CBE1 generates the message to the UE1 as time progresses or the key updated to be transmitted to the UE 1 within in the areas 1 and 2 as well as UE2.

The CBC sends the RNC the public key and key index at step 519. This process may occur when the UE location is changed, i.e. when the area to which the UE belongs is changed. For example, when the UE1 moves from areas 1 and 2 to areas 1 and 3, this process may occur and, at this time, the public key of the CBC may be generated newly as at step 515 or updated for transmission to the RNC as at step 519. Even when the public key KEY1 used by the UE1 in the areas 1 and 2 is updated to be transmitted to the UE2 entered the areas 1 and 2, this process is performed to notify the UE1 of the change. In order to notify of the key update or transmit the public key generated by the CBC to the UE, the process 541-1-3 and 541-3-3 may be performed.

At steps 541-1-3 and 541-3-3, the RNC sends the eNB the public key-key index pair of the CBC in an S1-AP message at step 541-3, an ATTACH/RAU ACCEPT message at step 531, or a GMM INFORMATION or MM INFORMATION message. Afterward, the eNB sends forwards the public key-key index pair of the CBC to the UE in an SIB BROADCAST message at step 541-3-3, an ATTACH/RAU ACCEPT message at step 533, or a GMM information or MM information message.

The UE stores the public key-key index pair of the CBC at step 545. The public key-key index pair of the CBS can be configured as in the follow embodiment. In embodiment 1, if the UE1 generates the KEY1 on Jan. 1, 2012, if the UE2 differs from the UE1 in time (e.g. Jan. 5, 2012), area (e.g. areas 1 and 2), or CBE, the public key may be updated and transmitted. In another embodiment, since the key1 is generated to the UE1 for use in the areas 1 and 2 and the key2 for use in the areas 1 and 3, the key1-key index1 and key2-key index2 pairs may be transmitted to the UE1.

In another embodiment, if the CBE1 and CBE2 transmit messages to the UE1 using the respective key1 and key4, different key indices and public keys may be transmitted.

The CBE sends the CBC an emergency information distribution request message at step 561. The CBC generates a warning message at step 565. This message may be transmitted within an area specified at cell level, TA level, or PLMN level. In order generate this message, the CBC searches for the key at step 563. The CBC generates the message using the public key corresponding to the area and CBE for use in transmitting the warning message from the CBC to the RNC at step 565.

In an embodiment, if the CBE1 has transmitted the emergency information distribution request and if the area is determined as areas 1 and 2 at cell level, the CBC searches for the public key fulfilling the conditions. If plural keys are found, e.g. key1 and key5 are found and if key5 is the key updated lately in the corresponding area, the UE which has received key1 updates the key to key5 for generating messages therewith. In the case that there are key1 and key5 for the same CBE and same areas 1 and 2, it may be possible to transmit the digital signatures generated using the public keys key1 and key5 and, if at least one of the digital signatures 1 and 5 is verified by the UE, determine that the authentication is successful.

The CBC sends the RNC a write-replace warning request message including the digital signature, key index, and digital signature algorithm at step 567.

If the digital signature algorithm has been agreed between the CBC and the UE, an identifier (id) of the digital signature algorithm is used for identification. In this case, the digital signature algorithm identifier may be transmitted. The RNC sends the CBC a write-replace warning confirm message at step 569. The CBC sends the CBE an emergency information distribution reply message at step 571.

Afterward, the MME confirms the area, i.e. the area for the RNC to transmit message as configured by the CBC for message transmission, at step 573. The RNC sends the UE a paging message and a primary notification message including the digital signature, key index, and digital signature algorithm or digital signature algorism index at step 577.

In another embodiment, the RNC sends the UE a CBS message including the digital signature, key index, and digital signature algorithm or digital signature algorism index through CTCH. The UE may verify the area information searches for the public key using the key index corresponding to the key as well as searches for the public key using the key index at step 581. The CBC verifies the digital signature with the public key of the CBC to authenticate the sender of the warning message at step 583.

The UE may send the RNC a warning message response complete message at step 585.

Figure 6:
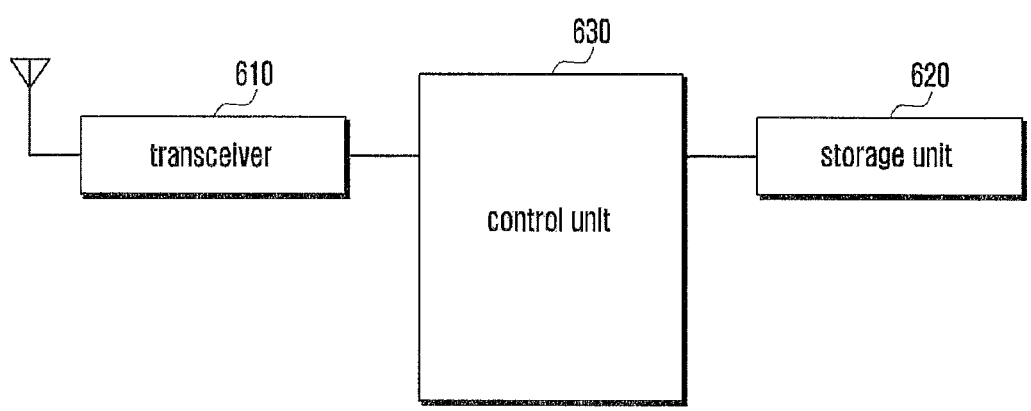
FIG. 6 is a block diagram illustrating a configuration of the UE according to an embodiment of the present invention.

FIG. 6 is a block diagram illustrating a configuration of the UE according to an embodiment of the present invention. As shown in FIG. 6, the UE according to an embodiment of the present invention may include a transceiver 610, a storage unit 620, and a control unit 630.

The transceiver 610 may transmit and receive signals to and from the eNB. Particularly, the transceiver may receive the public key and key index of a cell broadcast center through a S1 Application Protocol (A1-AP) message or ATTACH ACCEPT/TAU ACCEPT message.

According to an embodiment of the present invention, the storage unit 620 stores various programs for operations of the UE. Particularly, the storage unit 620 may receive and store the public key and key index of the cell broadcast center.

If a warning message including the digital signature, key index, and digital signature algorithm, the control unit 630 controls the storage unit 620 to store the informations. The control unit 630 also searches for the public key based on the key index included in the warning message and verifies the digital signature included in the warning message based on the public key to authenticate the sender. Although the description has been made with reference to particular embodiments, the present invention can be implemented with various modifications without departing from the scope of the present invention. Thus, the present invention is not limited to the particular embodiments disclosed but will include the following claims and their equivalents.

The invention claimed is:

1. A method for determining a transmitter of a warning message by a terminal in a mobile communication system, the method comprising:
   receiving and storing at least one pair of a public key of a cell broadcast center and a first key index corresponding to the public key in a single message, wherein each of the at least one pair of a public key and a first key index corresponds to a combination of an area where a warning message is transmitted, an area level for the warning message and a transmitter of the warning message;
   receiving a warning message including a digital signature signed by the cell broadcast center, a second key index, and a digital signature algorithm from a base station;
   identifying a public key from the stored at least one pair of the public key and the first key index based on the second key index included in the warning message;
   identifying information on an area corresponding to the identified public key based on the second key index included in the warning message; and
   determining a transmitter of the warning message by verifying the digital signature included in the warning message based on the identified public key,
   wherein the area level for the warning message is a cell level, a tracking area level, or a public land mobile network (PLMN) level, and
   wherein the at least one pair of the public key and the first key index corresponds to a location of the terminal.

2. The method of claim 1, wherein the at least one pair of the public key and the first key index are received using at least one of a S1-Application Protocol (S1-AP) message, an attach accept message, and a tracking area update accept message transmitted by the base station.

3. The method of claim 1, wherein each of the at least one pair of the public key and the first key index is determined depending on a digital signature algorithm.

4. The method of claim 1, wherein the digital signature signed by the cell broadcast center is generated based on an area for broadcasting the warning message and a public key corresponding to a cell broadcast entity which requests transmission of the warning message.

5. The method of claim 1, further comprising:
transmitting a response message in response to the determined transmitter.

6. The method of claim 1, further comprising:
receiving an updated pair of a public key and a key index, if location of the terminal is changed.

7. A terminal receiving a warning message in a mobile communication system, the terminal comprising:
a transceiver configured to transmit and receive signals; and
a controller coupled with the transceiver and configured to:
control the transceiver to receive at least one pair of a public key of a cell broadcast center and a first key index corresponding to the public key in a single message, wherein each of the at least one pair of a public key and a first key index corresponds to a combination of an area where a warning message is transmitted, an area level for the warning message and a transmitter of the warning message,
store the received at least one pair of the public key of the cell broadcast center and the first key index,
control the transceiver to receive a warning message including a digital signature signed by the cell broadcast center, a second key index, and a digital signature algorithm from a base station,
identify a public key from the stored at least one pair of the public key and the first key index based on the second key index included in the warning message,
identify information on an area corresponding to the identified public key based on the second key index included in the warning message, and
determine a transmitter of the warning message by verifying the digital signature included in the warning message based on the identified public key,
wherein the area level for the warning message is a cell level, a tracking area level, or a public land mobile network (PLMN) level, and
wherein the at least one pair of the public key and the first key index corresponds to a location of the terminal.

8. The terminal of claim 7, wherein the at least one pair of the public key and the first key index are received using at least one of a S1-Application Protocol (S1-AP) message, an attach accept message, and a tracking area update accept message transmitted by the base station.

9. The terminal of claim 7, wherein each of the at least one pair of the public key and the first key index is determined depending on a digital signature algorithm.

10. The terminal of claim 7, wherein the digital signature signed by the cell broadcast center is generated based on an area for broadcasting the warning message and a public key corresponding to a cell broadcast entity which requests transmission of the warning message.

11. The terminal of claim 7, wherein the controller further configured to control the transceiver to transmit a response message in response to the determined transmitter.

12. The terminal of claim 7, wherein the controller further configured to control the transceiver to receive an updated pair of a public key and a key index, if location of the terminal is changed.

* * * * *